US009243383B2

(12) United States Patent
Inada et al.

(10) Patent No.: US 9,243,383 B2
(45) Date of Patent: Jan. 26, 2016

(54) WORKING MACHINE (71) Applicant: KOBELCO CONSTRUCTION MACHINERY CO., LTD., Hiroshima-shi (JP)

(72) Inventors: Yusuke Inada, Hiroshima (JP); Asuka Ushiroguchi, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/484,930

(22) Filed: Sep. 12, 2014

(65) Prior Publication Data
US 2015/0075895 A1   Mar. 19, 2015

(30) Foreign Application Priority Data
Sep. 19, 2013   (JP) ................. 2013-193939

(51) Int. Cl.
*E02F 9/08*     (2006.01)
*B60K 13/04*    (2006.01)
*F01N 13/08*    (2010.01)
*F01N 13/18*    (2010.01)

(52) U.S. Cl.
CPC ............. *E02F 9/0866* (2013.01); *B60K 13/04* (2013.01); *E02F 9/0808* (2013.01); *F01N 13/082* (2013.01); *F01N 13/1805* (2013.01); *F01N 2470/02* (2013.01); *F01N 2590/08* (2013.01)

(58) Field of Classification Search
CPC ......... E02F 9/0808; E02F 9/0866; E02F 9/08; B60K 13/04; F01N 13/082
USPC ................................. 180/309, 68.1
See application file for complete search history.

(56) References Cited

U.S. PATENT DOCUMENTS

| 2005/0188926 | A1   | 9/2005 | Kimura et al. |
| 2013/0068177 | A1 * | 3/2013 | Yotsuzuka ................. 123/41.58 |
| 2013/0071212 | A1 * | 3/2013 | Yunoue et al. ................ 414/685 |
| 2013/0075171 | A1 * | 3/2013 | Noguchi et al. ............. 180/65.1 |

(Continued)

FOREIGN PATENT DOCUMENTS

| EP | 1 571 046 A1 | 9/2005 |
| EP | 2 578 755 A2 | 4/2013 |

(Continued)

OTHER PUBLICATIONS

Extended European Search Report issued Feb. 5, 2015 in Patent Application No. 14184611.3.

*Primary Examiner* — Brodie Follman
*Assistant Examiner* — Brian Cassidy
(74) *Attorney, Agent, or Firm* — Oblon, McClelland, Maier & Neustadt, L.L.P.

(57) ABSTRACT

An upper slewing body includes a rear wall portion covering an engine room from a rear side, a bottom plate disposed so as to cover the engine room from a lower side and having an exhaust opening, and a pair of vertical plates standing upright on the bottom plate. A rear end portion of the vertical plate has proximate rear end surfaces disposed adjacent to the rear wall portion and a cutout portion formed by recessing the rear end surface of the vertical plate toward the front side with respect to the proximate rear end surfaces. A distal end portion of a tail pipe is introduced between the vertical plates and through the cutout portion from the outer position of the vertical plates and extends along the exhaust opening in a state where the distal end portion of the tail pipe faces the exhaust opening.

8 Claims, 5 Drawing Sheets

(56) References Cited

U.S. PATENT DOCUMENTS

| | | |
|---|---|---|
| 2013/0081887 A1 | 4/2013 | Tsuchihashi et al. |
| 2013/0174526 A1* | 7/2013 | Watanabe et al. ............ 55/385.7 |
| 2013/0175109 A1* | 7/2013 | Takatsuji ...................... 180/309 |
| 2013/0223967 A1* | 8/2013 | Shimizu et al. ............ 414/744.2 |
| 2014/0144717 A1 | 5/2014 | Nakashima |

FOREIGN PATENT DOCUMENTS

| | | |
|---|---|---|
| EP | 2 578 755 A3 | 4/2013 |
| EP | 2 735 712 A1 | 5/2015 |
| JP | 2009-30559 A | 2/2009 |
| JP | 2013-24078 | 2/2013 |

\* cited by examiner

WORKING MACHINE

BACKGROUND OF THE INVENTION

1. Technical Field of the Invention

The present invention relates working machines such as a hydraulic shovel, and among them, more particularly, to a working machine of a model in which gas is discharged through an exhaust opening formed in a floor wall portion that covers an engine room from a lower side.

2. Description of the Background Art

In general, in a working machine, an exhaust opening is formed in an upper wall portion or a rear wall portion that covers an engine room, and gas is discharged in a horizontal direction through the exhaust opening.

However, in this case, in a mini shovel or the like that has a driver's seat open to the surroundings, there is a problem in that since the driver's seat is disposed near an exhaust opening, the operator is likely to be influenced by the heat and the noise of exhaust gas.

Thus, in order to reduce the influence of the heat or the like of exhaust gas from reaching the driver's seat, a gas exhaust structure is proposed in which a distal end (tail pipe) of an exhaust pipe that blows exhaust gas is disposed inside an engine room and the exhaust gas is discharged through an exhaust opening formed in a floor wall portion disposed so as to cover the engine room from the lower side (for example, Japanese Patent Application Publication No. 2013-24078).

Specifically, a mini shovel of Japanese Patent Application Publication No. 2013-24078 includes a cylindrical duct extending in an up-down direction on a lateral side of an engine. This duct is configured to guide gas inside the engine room to the exhaust opening that is open on the lower side of the engine room. Further, a tail pipe is inserted in the duct.

Thus, the gas inside the engine room and the exhaust gas are mixed in the duct and the heat and the noise of the exhaust gas are reduced. After that, the mixture gas is discharged downward from the exhaust opening.

Although not described in Japanese Patent Application Publication No. 2013-24078, in a small working machine of a model such as a mini shovel, a number of members are densely disposed in the engine room. Due to this, there is practically no space margin inside the engine room.

In particular, since the space of the engine room on both sides of the engine is narrow, it is not easy to secure the space for disposing such a cylindrical duct as disclosed in Japanese Patent Application Publication No. 2013-24078.

SUMMARY OF THE INVENTION

An object of the present invention is to provide a working machine in which gas is discharged through an exhaust opening formed in a floor wall portion that covers an engine room from a lower side and which can discharge exhaust gas from the exhaust opening while reducing the heat and the noise of the exhaust gas even when members are densely disposed inside the engine room and there is no space margin.

In order to solve the problems, the present invention provides a working machine including: a lower traveling body; and an upper slewing body provided on the lower traveling body so as to be able to slew and the upper slewing body being configured to perform a working operation according to an operation of an operator, wherein the upper slewing body includes: an engine provided in a rear portion of the upper slewing body; an exhaust pipe extending from the engine in order to guide exhaust gas; a rear wall portion covering an engine room accommodating the engine from a rear side; a floor wall portion that disposed so as to cover the engine room from a lower side and the floor wall portion having an exhaust opening that opens the engine room to a lower side; and a pair of vertical plates standing upright on both left and right sides of the exhaust opening of the floor wall portion and the pair of vertical plates extending in a front-rear direction on a lower side of the engine, one of the pair of vertical plates is a pipe-insertion vertical plate, and the pipe-insertion vertical plate includes a rear end portion having a proximate rear end surface disposed adjacent to the rear wall portion so as to prevent the exhaust pipe from passing between the pipe-insertion vertical plate and the rear wall portion and a cutout portion formed by recessing a rear end surface of the pipe-insertion vertical plate toward a front side with respect to the proximate rear end surface, the exhaust pipe is disposed across an outer position of the pair of vertical plates and an inner position of the pair of vertical plates through the cutout portion and has a distal end portion for discharging the exhaust gas, and the distal end portion of the exhaust pipe is disposed at the inner position of the pair of vertical plates, and the distal end portion of the exhaust pipe extends along the exhaust opening in a state of facing the exhaust opening.

According to the working machine of the present invention, it is possible to discharge exhaust gas from the exhaust opening while reducing the heat and the noise of the exhaust gas even when members are densely disposed inside the engine room and there is no space margin.

DETAILED DESCRIPTION OF THE PREFERRED EMBODIMENTS OF THE INVENTION

Hereinafter, an embodiment of the present invention will be described with reference to the accompanying drawings. The following embodiment is a specific example of the present invention and is not intended to restrict the technical scope of the present invention.

Figure 1:
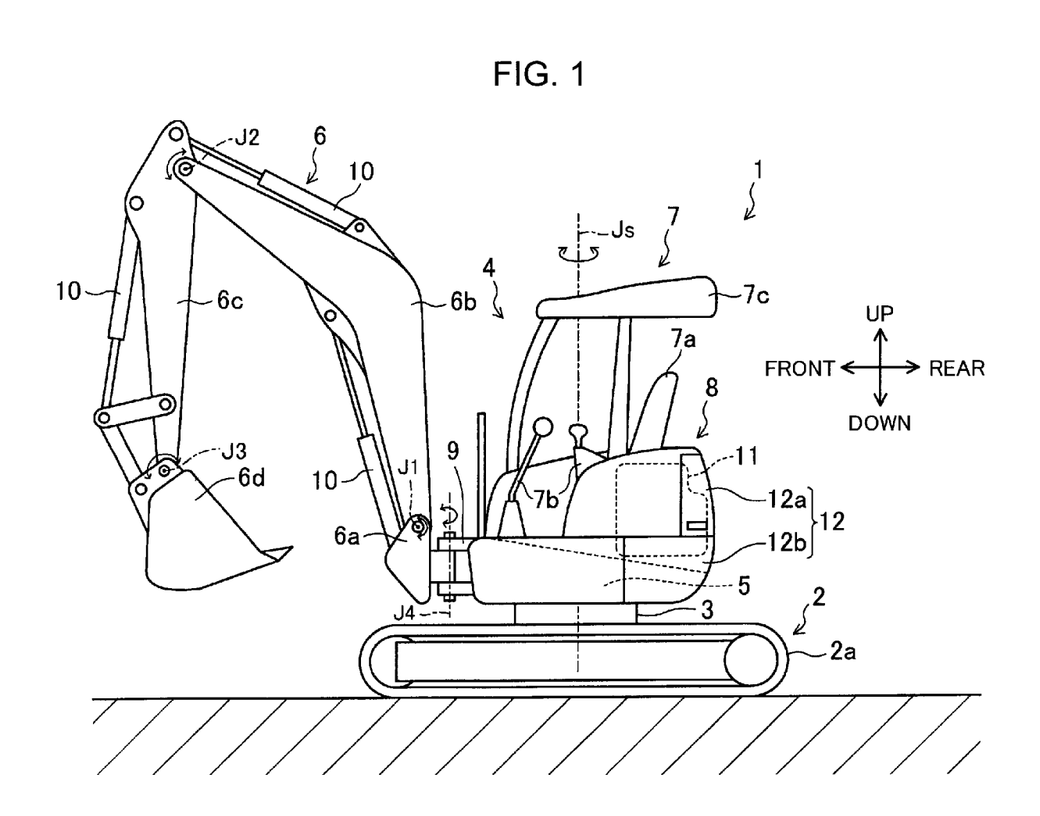
FIG. 1 is a schematic side view illustrating a hydraulic shovel according to an embodiment of the present invention.

FIG. 1 illustrates a hydraulic shovel 1 (an example of a working machine) to which the present invention is applied. The hydraulic shovel 1 is a small working machine of a model (so-called a mini shovel) that weighs five tons or less. The hydraulic shovel 1 includes a lower traveling body 2 having a pair of traveling crawlers 2a and an upper slewing body 4 provided so as to be able to slew on the lower traveling body 2, via a slewing bearing 3. The upper slewing body 4 can slew about a slewing shaft Js that extends in an up-down direction.

The upper slewing body 4 includes an upper frame 5, an attachment 6, a driver's seat 7, an engine 11, exhaust pipes (see 11a to 11c in FIG. 3), a frame 45 (see FIG. 3), and an engine room 8. The upper frame 5 is provided in a lower portion of the upper slewing body 4, and the attachment 6 is provided in a front portion of the upper slewing body 4. The engine 11 is provided in a rear portion of the upper slewing body 4. The engine room 8 accommodates the engine 11 and is provided in a rear portion of the upper slewing body 4. The driver's seat 7 is provided in a central portion of the upper slewing body 4 so as to be adjacent to the engine room 8 (the engine 11) in a forward-backward direction.

In each drawing, the up-down, front-rear, and left-right directions used in the description are indicated by arrows, with the direction, in which the upper slewing body 4 is oriented, being used as a reference, unless mentioned otherwise.

The attachment 6 is configured to perform a work operation according to an operation of an operator and includes a swing bracket 6a, a boom 6b, an arm 6c, a bucket 6d, and a plurality of hydraulic cylinders 10. The boom 6b has a base end that is supported so as to be able to swing about a horizontal shaft J1 with respect to the swing bracket 6a. The arm 6c has a base end that is supported so as to be able to swing about a horizontal shaft J2 with respect to a distal end of the boom 6b. The bucket 6d is supported so as to be able to swing about a horizontal shaft J3 with respect to a distal end of the arm 6c.

The swing bracket 6a is supported so as to be able to swing about a vertical shaft J4 with respect to a bracket support 9 that is provided in a front portion of the upper frame 5. Thus, in the hydraulic shovel 1, the boom 6b, the arm 6c, and the bucket 6d can swing in the left-right direction.

The plurality of hydraulic cylinders 10 can be extended and retracted when the hydraulic cylinder 10 is hydraulically controlled, and the boom 6b, the arm 6c, and the bucket 6d operate in synchronization with this extension and retraction operation.

The engine room 8 accommodates the engine 11 and the like. The upper slewing body 4 includes a cover that has a rear wall portion 12 and the like. The rear wall portion 12 that covers the engine room 8 from the rear side is configured by two upper and lower members. Specifically, the rear wall portion 12 includes a rear cover 12a that is made of a steel plate and that has a door capable of opening and closing an opening portion (not shown) for opening the engine room 8 to the rear side and a weight wall portion 12b that is made of a heavy cast material and that is configured to function as a counterweight.

The driver's seat 7 includes a seat 7a that the operator sits on, operating devices such as an operating lever 7b disposed around the seat 7a, and a canopy 7c that covers the seat 7a from the upper side. In a state where the seat 7a is covered by the canopy 7c, the seat 7a is open to the surroundings (the front-rear and left-right directions). The surroundings of the driver's seat 7 may be covered by a box-shaped cover (cab).

The driver's seat 7 is assembled with the upper frame 5 in a state where the seat 7a and the operating devices are assembled and integrated.

Figure 2:
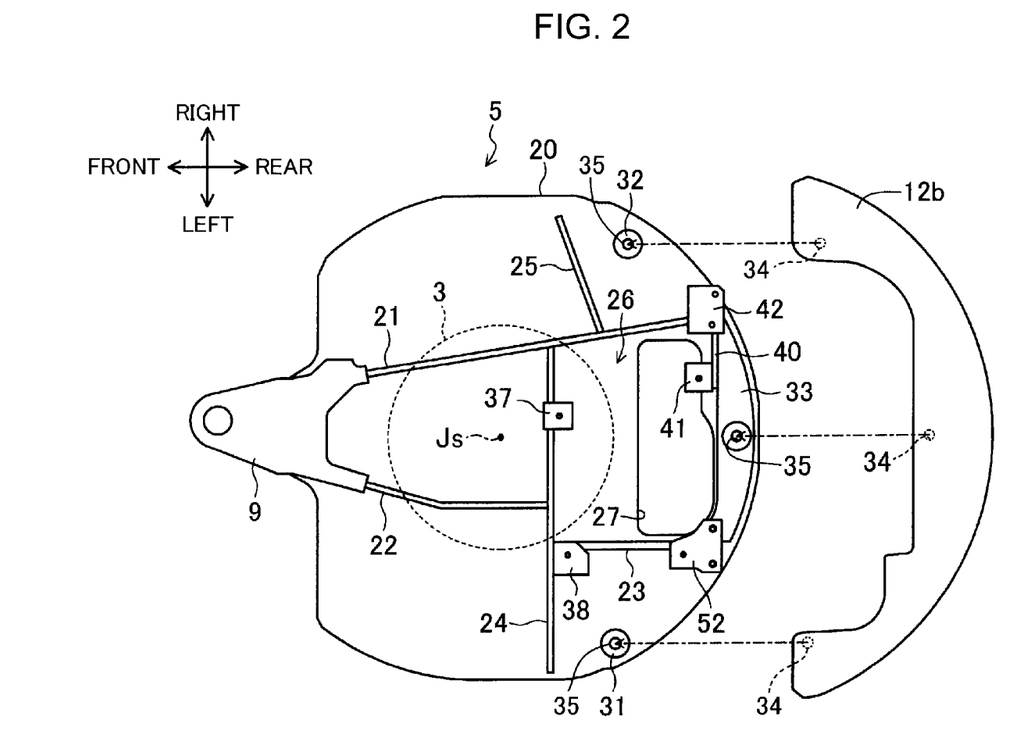
FIG. 2 is a schematic plan view illustrating a main structure of an upper frame and main components assembled with the upper frame.
Figure 3:
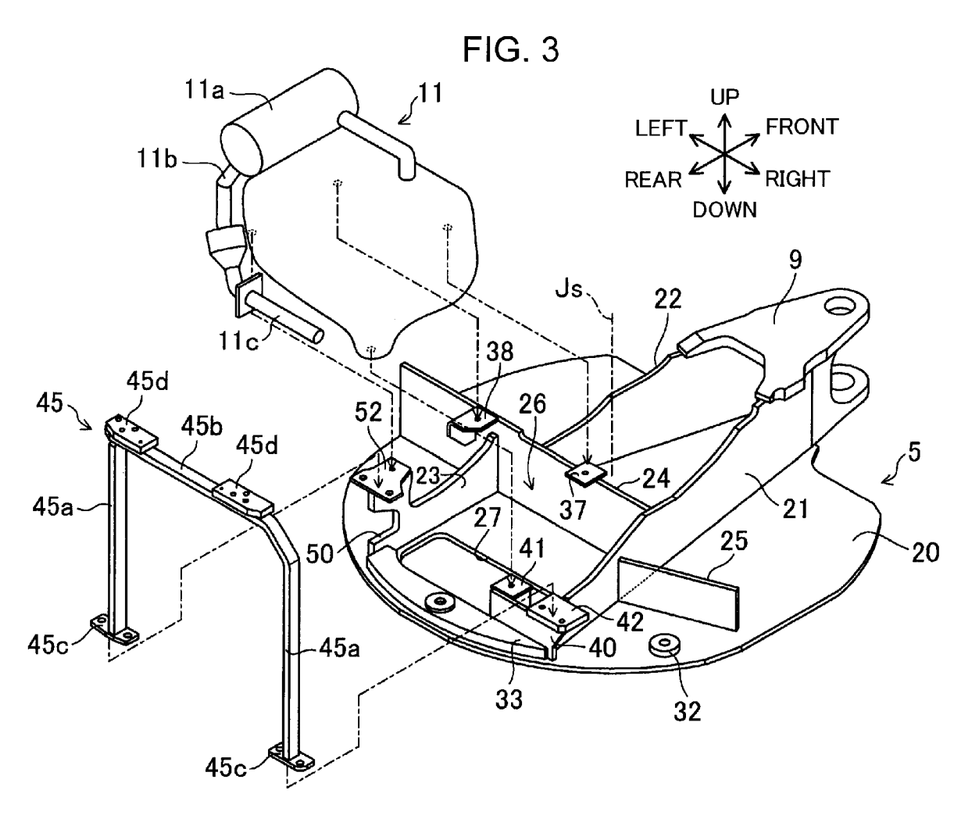
FIG. 3 is a schematic perspective view illustrating a main structure of the upper frame and main components assembled with the upper frame.

As illustrated in FIGS. 2 and 3 in a simplified manner, the upper frame 5 includes a bottom plate 20, a plurality of vertical plates 21 to 23, a plurality of beam plates 24 and 25, a plurality of engine pedestals 37, 38, 41, and 52, and a plurality of weight pedestals 31 to 33. The bottom plate 20, the vertical plates 21 to 23, the beam plates 24 and 25, the engine pedestals 37, 38, 41, and 52, and the weight pedestals 31 to 33 are made of a thick metal plate having excellent strength and rigidity and are assembled and integrated by being bonded (welded) together.

The bottom plate 20 is an approximately circular plate-like member that spreads along a plane orthogonal to the slewing shaft Js. A central portion of a bottom surface of the bottom plate 20 is supported by the lower traveling body 2 via the slewing bearing 3. The bracket support 9 is provided at a midpoint in the left-right direction of a front portion of the bottom plate 20. The bracket support 9 protrudes further toward the front side than the bottom plate 20.

A front end portion of the first vertical plate 21 is bonded to a right side portion of the bracket support 9, and a front end portion of the second vertical plate 22 is bonded to a left side portion of the bracket support 9. The first and second vertical plates 21 and 22 stand upright on an upper surface of the bottom plate 20. Both vertical plates 21 and 22 face each other in the left-right direction and extends in the front-rear direction and are disposed so that the gap between both vertical plates 21 and 22 increases as the vertical plates 21 and 22 advance toward the rear side.

In the hydraulic shovel 1, the first vertical plate 21 on the right side is longer than the second vertical plate 22 on the left side. Specifically, a rear end of the first vertical plate 21 is positioned near a rear end edge of the bottom plate 20, and a rear end of the second vertical plate 22 is positioned in the midpoint in the front-rear direction of the bottom plate 20.

The beam plate 24 (hereinafter referred to as a first beam plate 24) extends in the left-right direction and stands upright on the bottom plate 20. Specifically, the first beam plate 24 is provided in the midpoint in the front-rear direction of the bottom plate 20 (specifically, the first beam plate 24 is provided at a position of the rear side than the slewing shaft Js and in a range in the front-rear direction where the slewing bearing 3 is provided). Moreover, the first beam plate 24 is disposed so that a portion of the first beam plate 24 overlaps the revolving bearing 3. The left end of the first beam plate 24 is positioned near a left side end edge of the bottom plate 20, and the right end of the first beam plate 24 is bonded to a left side surface of the first vertical plate 21. The rear end of the second vertical plate 22 is bonded to a front surface of the first beam plate 24.

The vertical plate 23 (hereinafter referred to as a third vertical plate 23) extends in the front-rear direction and stands upright on the bottom plate 20. Specifically, the front end of the third vertical plate 23 is bonded to a rear surface of the first beam plate 24 at a position separated toward the left side from the rear end of the second vertical plate 22. On the other hand, the rear end of the third vertical plate 23 is positioned near the rear end edge of the bottom plate 20.

The beam plate 25 (hereinafter referred to as a second beam plate 25) stands upright on the bottom plate 20 and tilts so as to extends toward the front side as the beam plate 25 advances toward the right side. Specifically, the left end of the second beam plate 25 is bonded to the right side surface of the first vertical plate 21 at a position separated toward the rear side from the right end of the first beam plate 24.

An exhaust opening 27 is provided in a portion (hereinafter referred to as a partition portion 26) in which the front side and both left and right sides of the bottom plate 20 are surrounded by the first beam plate 24, the first vertical plate 21, and the third vertical plate 23. The exhaust opening 27 is an oblong opening that penetrates through the bottom plate 20 in the up-down direction and extends in the left-right direction. The exhaust opening 27 is positioned in a rear portion of the partition portion 26 and extends in the left-right direction between both rear end portions of the first and third vertical plates 21 and 23.

The engine room 8 is approximately disposed on the rear side of the first beam plate 24. Thus, a portion of the bottom plate 20 disposed on the rear side of the first beam plate 24 corresponds to a floor wall portion that covers the lower portion of the engine room 8. That is, the portion of the bottom plate 20 disposed on the rear side of the first beam plate 24 is disposed so as to cover the engine room 8 from the lower side and has the exhaust opening 27 that opens the engine room 8 to the lower side.

Moreover, the rear end portion of the first vertical plate 21 and the third vertical plate 23 correspond to a pair of vertical plates that stands upright on both left and right sides of the exhaust opening 27 in the floor wall portion and extends in the front-rear direction on the lower side of the engine 11.

Further, the first beam plate 24 corresponds to a beam plate that stands upright on the front side of the exhaust opening 27 in the floor wall portion and connects the pair of vertical plates on the lower side of the engine 11.

The left side weight pedestal 31 is disposed on the rear side of the left end portion of the first beam plate 24 of the bottom plate 20, and the right side weight pedestal 32 is disposed on the rear side of the right end portion of the second beam plate 25 of the bottom plate 20. Both weight pedestals 31 and 32 are provided at bilaterally symmetric positions of the bottom plate 20. Moreover, the intermediate weight pedestal (weight support member) 33 that extends along the rear end edge of the bottom plate 20 on the rear side of the exhaust opening 27 is disposed at a position of the bottom plate 20 between the rear end of the first vertical plate 21 and the rear end of the third vertical plate 23.

The weight pedestals 31, 32, and 33 are configured to support the weight wall portion 12b. Specifically, the weight pedestals 31, 32, and 33 are made of a thick metal plate and are bonded to the bottom plate 20 in a state where the weight pedestals 31, 32, and 33 overlap the upper surface of the bottom plate 20. Insertion holes 35 that penetrate through the bottom plate 20 and the weight pedestals 31, 32, and 33 in the up-down direction are formed in the weight pedestals 31, 32, and 33 so as to correspond to the arrangement of fastener holes 34 formed in the lower portion of the weight wall portion 12b.

In a state where the weight wall portion 12b is placed on the weight pedestals 31, 32, and 33, bolts inserted through the insertion holes 35 are fastened into the fastener holes 34, whereby the weight wall portion 12b is detachably assembled with the upper frame 5. That is, the bottom plate 20 and the weight pedestals 31, 32, and 33 correspond to a rear wall attachment portion that allows attachment and detachment of the weight wall portion 12b.

The right-front engine pedestal 37 is configured to support the engine 11 and is bonded to the right side of a bonding position of the first beam plate 24. At the bonding position, the first beam plate 24 is bonded to the second vertical plate 22. The left-front engine pedestal 38 is configured to support the engine 11 and is bonded to a portion near a bonding position of the first beam plate 24. At the bonding position, the first beam plate 24 is bonded to the third vertical plate 23.

A right side bracket 40 that stands upright on the bottom plate 20 and extends in the left-right direction is bonded to the rear end of the first vertical plate 21. A lower end portion of the right side bracket 40 is bonded to the intermediate weight pedestal 33 in order to improve the strength and rigidity of the right side bracket 40. The right-rear engine pedestal 41 and a right frame pedestal 42 arranged in a horizontal direction (left-right direction) are attached to an upper end portion of the right side bracket 40.

In the hydraulic shovel 1, the left side bracket, the left-rear engine pedestal, and the left frame pedestal are disposed so as to face the right side bracket 40, the right-rear engine pedestal 41, and the right frame pedestal 42 in the left-right direction. The left side bracket, the left-rear engine pedestal, and the left frame pedestal are provided using the third vertical plate 23 by adjusting the arrangement of the exhaust pipes. The details thereof will be described later.

As illustrated in FIG. 3, the engine 11 and the frame 45 are assembled with the upper frame 5.

The engine 11 is attached to four engine pedestals in a state where the engine 11 is disposed sideways so that a crank shaft extends in the left-right direction. Due to this, since the upper side of the partition portion 26 of the bottom plate 20 is blocked by the engine 11, so-called dead space is formed in the space between the partition portion 26 and the engine 11.

The exhaust pipes extend from the engine 11 in order to guide exhaust gas. The exhaust pipes include a muffler 11a, a relay pipe 11b, and a tail pipe 11c. In the hydraulic shovel 1, the relay pipe 11b extends toward the left side from the upper surface of the engine 11 and extends downward along the rear side edge of the engine 11 via the muffler 11a. The tail pipe 11c is connected to a distal end portion of the relay pipe 11b and is disposed on a rear lower side of the engine 11. The arrangement of the exhaust pipes will be described later. Moreover, a plurality of jetting holes 11d for releasing exhaust gas is formed in a distal end portion of the tail pipe 11c (see FIG. 4).

The frame 45 includes a pair of columns 45a facing in the left-right direction and a beam portion 45b that is bridged between the upper end portions of the columns 45a and has an arch shape. A fastening flange 45c is provided in the lower end of each column 45a, and pedestals 45d for supporting the driver's seat 7 are provided in the beam portion 45b.

The frame 45 is assembled with the upper frame 5 by attaching the flanges 45c to the left and right frame pedestals 42 and 52.

In the hydraulic shovel 1, the tail pipe 11c is disposed inside the engine room 8, and exhaust gas is discharged from the lower side of the engine room 8 through the exhaust opening 27.

Here, an inner structure of the engine room 8 is devised so that exhaust gas can be efficiently discharged using a limited space of the engine room 8 and assembling and maintenance of the tail pipe 11c can be efficiently performed.

Figure 4:
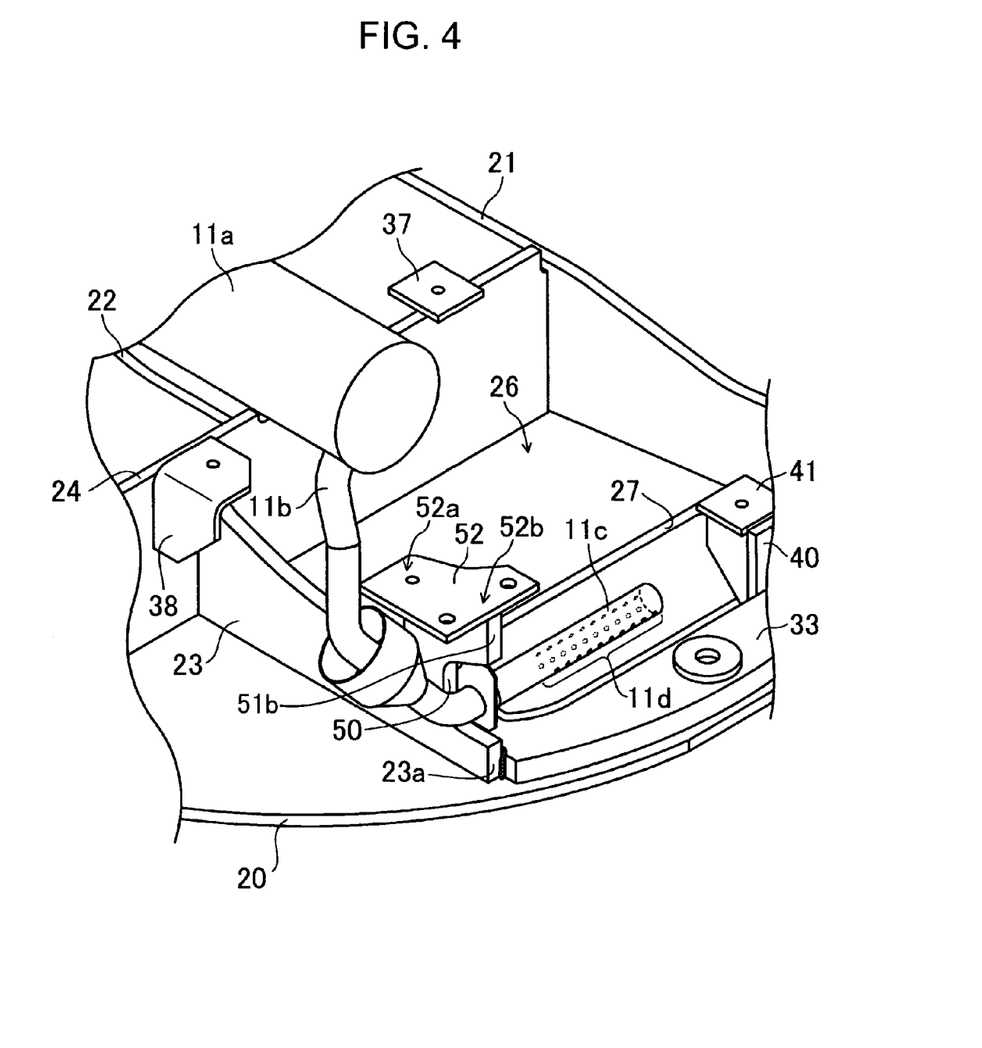
FIG. 4 is a schematic perspective view illustrating a rear portion of the upper frame at an enlarged scale.
Figure 5:
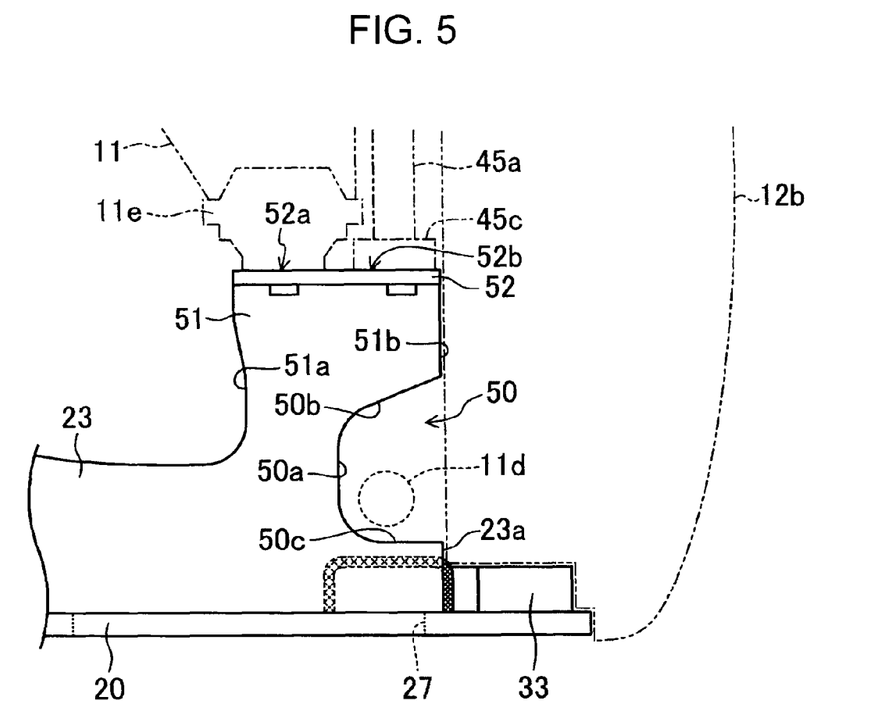
FIG. 5 is a schematic side view illustrating a rear portion of the upper frame at an enlarged scale.

As illustrated in detail in FIGS. 4 and 5, the rear end portion of the third vertical plate 23 includes proximate rear end surfaces 23a and 51b that face the rear side and are located close to the weight wall portion 12b so as to prevent the exhaust pipe (the tail pipe 11c) from passing between the third vertical plate 23 and the weight wall portion 12b and a large cutout portion 50 formed by recessing the rear end surface of the third vertical plate 23 toward the front side with respect to the proximate rear end surfaces 23a and 51b. That is, the third vertical plate 23 corresponds to a pipe-insertion vertical plate that includes the proximate rear end surfaces 23a and 51b and the cutout portion 50.

Specifically, the rear end portion of the third vertical plate 23 includes an extension portion 51 that extends upward further than an upper end of a portion of the third vertical plate 23 located adjacent to the front side of extension portion 51. The extension portion 51 also serves as a bracket that supports a common pedestal 52 described later from the lower side. Specifically, a front end surface 51a of the extension portion 51 extends upward from an upper end surface of the portion of the third vertical plate 23 located adjacent to the front side of the extension portion 51, and a rear end surface 51b of the extension portion 51 is separated toward the rear side from the front end surface 51a and is disposed on the same plane as the rear end surface 23a of the third vertical plate 23.

The cutout portion 50 is formed by recessing greatly the rear end surface of the third vertical plate 23 toward the front side in a range across both the extension portion 51 and the lower portion of the extension portion 51, in the rear end portion of the third vertical plate 23. The cutout portion 50 has such an approximately trapezoidal shape that an upper side thereof is positioned on the front side and a lower side thereof is open to the rear side when seen in the left-right direction (in the viewpoint of FIG. 5). Moreover, a rear end surface of an edge portion 50a of the third vertical plate 23 located adjacent to the upper side of the cutout portion 50 is positioned in an approximately intermediate portion of the width in the front-rear direction of the extension portion 51.

A lower end surface of an edge portion 50b of the third vertical plate 23 located adjacent to the upper side of the cutout portion 50 is tilted downward as the lower end surface of the edge portion 50b of the third vertical plate 23 advances toward the front side. Moreover, an upper end surface of an edge 50c of the third vertical plate 23 located adjacent to the lower side of the cutout portion 50 is disposed approximately in parallel to the bottom plate 20. The upper and lower corners of the cutout portion 50 are subjected to rounding (R-processing) so as to have a curved surface.

By forming the cutout portion 50 in such a manner, it is possible to reduce an abrupt change in the cross-sectional area of the edge portion of the third vertical plate 23 located adjacent to the cutout portion 50. Due to this, even when heavy load is applied to the extension portion 51 (the common pedestal 52 described later) from the upper side, it is possible to suppress concentration of stress on the edge portion of the third vertical plate 23 located adjacent to the cutout portion 50. Thus, even when the large cutout portion 50 is formed, the extension portion 51 functions stably as a bracket for supporting the common pedestal 52.

The common pedestal 52 that is configured to perform the functions of both a left-rear engine pedestal for supporting the left-rear portion of the engine 11 and a left frame pedestal for supporting the left side flange 45c of the frame 45 is bonded to the upper end of the extension portion 51. The common pedestal 52 corresponds to a device support member for supporting a predetermined device (the frame 45) above the cutout portion 50.

Specifically, a first support portion 52a that is configured to function as the left-rear engine pedestal and supports the engine 11 via a vibration isolator 11e is provided on the front side of the common pedestal 52. On the other hand, a second support portion 52b that is configured to function as the left frame pedestal and supports the frame 45 (the driver's seat 7) is provided on the rear side of the common pedestal 52. Both support portions 52a and 52b are disposed at different positions in the front-rear direction of the common pedestal 52.

The two support portions 52a and 52b to which heavy load is applied are collectively provided in one common pedestal 52 and the common pedestal 52 can be supported by the rear end portion of the third vertical plate 23. Further, since both support portions 52a and 52b are distributed in the front-rear direction along which the third vertical plate 23 (the extension portion 51) extends (that is, a direction in which the extension portion 51 exhibits excellent strength and rigidity), it is possible to transmit the load applied to both support portions 52a and 52b to the extension portion 51 in a well-balanced manner and to support both support portions 52a and 52b stably.

The rear end portion of the third vertical plate 23 is bonded to the intermediate weight pedestal 33 as well as the bottom plate 20. Specifically, a left end portion of the intermediate weight pedestal 33 is in contact with a lower portion of the right side surface at the rear end portion of the third vertical plate 23, and the third vertical plate 23 and the intermediate weight pedestal 33 are welded together along this contacting position. Due to this, the rear end portion of the third vertical plate 23 is tightly fixed to the bottom plate 20 and the strength and rigidity of the third vertical plate 23 are strengthened.

As described above, since the strength and rigidity of the rear end portion of the third vertical plate 23 are strengthened structurally, the rear end portion of the third vertical plate 23 can be used as a bracket of the common pedestal 52 to which heavy load is applied even when the large cutout portion 50 is formed in the third vertical plate 23.

As illustrated in FIGS. 3 and 4, the relay pipe 11b of the exhaust pipe is disposed across an outer position (the position on the left side of the third vertical plate 23) of the pair of vertical plates 21 and 23 and an inner position (the position between both vertical plates 21 and 23) of the pair of vertical plates 21 and 23 through the cutout portion 50 formed in the rear end portion of the third vertical plate 23. The tail pipe (the distal end of the exhaust pipe) 11c connected to the distal end portion of the relay pipe 11b is disposed at the inner position (the space on the partition portion 26) of the vertical plates 21 and 23. Further, the tail pipe 11c extends in the left-right direction along the exhaust opening 27 in a state of facing the exhaust opening 27 in the up-down direction.

As described above, by using the dead space provided under the engine 11 as a duct, it is possible to eliminate a duct which has been provided conventionally.

Specifically, when the distal end portion (the tail pipe 11c) of the exhaust pipe is disposed in the space (dead space) surrounded by the engine 11, the pair of vertical plates 21 and 23, the bottom plate 20, and the rear wall portion 12, gas inside the engine room 8 and exhaust gas are mixed together in the space and this mixture is discharged from the exhaust opening 27.

Thus, even when members are densely disposed inside the engine room 8 and there is no space margin, it is possible to discharge exhaust gas from the exhaust opening while reducing the heat and the noise of the exhaust gas.

Here, since the engine 11 overlaps the third vertical plate 23 from the upper side, a height of a portion (hereinafter referred to as an engine overlap portion) of the third vertical plate 23 that the engine 11 overlaps is limited. Thus, for example, when a hole is formed in the engine overlap portion of the third vertical plate 23 or an upper end portion of the engine overlap portion of the third vertical plate 23 is cut out to form an insertion portion for the tail pipe 11c, it is not possible to secure a sufficient cross-sectional area (height) of an engine mounting portion. Therefore, the strength and rigidity of the third vertical plate 23 decrease and the original function is impaired. Further, in this case, since it is not possible to detach the third vertical plate 23 from the bottom plate 20 and there is no space margin around the engine 11, it becomes very difficult to assemble or disassemble the tail pipe 11c.

In contrast, in the construction machine 1, the rear end portion of the third vertical plate 23 has the cutout portion 50 formed by recessing the rear end surface of the third vertical plate 23 toward the front side with respect to the proximate rear end surfaces 23a and 51b of the third vertical plate 23. Due to this, when the cutout portion 50 is formed at a position on the rear side of the engine overlap portion of the third vertical plate 23, it is possible to effectively suppress the effect made on the strength and rigidity of the third vertical plate 23 by increasing in the cross-sectional area (height) of the third vertical plate 23. Thus, in this case, it is possible to secure the original function of the third vertical plate 23.

Further, since the cutout portion 50 has such a shape that is open to the rear side, it is possible to insert the tail pipe 11c into the cutout portion 50 from the rear side and to dispose the tail pipe 11c in the rear corner of the engine room 8. Due to this, it becomes easy to handle the tail pipe 11c. For example, even when the muffler 11a and the tail pipe 11c are assembled in advance to be integrated with the relay pipe 11b, since the tail pipe 11c can be assembled with the upper frame 5 without any modification, the assembling workability is excellent.

During maintenance, since the tail pipe 11c is positioned immediately below the door of the rear cover 12a when the door is open, the tail pipe 11c can be visually identified with ease and a working space can be easily secured. Thus, it becomes easy to assemble and disassemble the tail pipe 11c.

Since the tail pipe 11c is disposed along the exhaust opening 27, it is possible to efficiently discharge exhaust gas toward the lower side of the engine room 8. The distal end portion of the tail pipe 11c is disposed in the dead space (the space surrounded by the partition portion 26 of the bottom plate 20, both vertical plates 21 and 23, the rear wall portion 12, and the first beam plate 24) under the engine 11. Due to this, it is possible to dispose the tail pipe 11c in the engine room 8 without interfering with other members and to eliminate a duct.

According to the embodiment, the extension portion 51 of the third vertical plate 23 can be used as a bracket for supporting the common pedestal 52. Here, since the extension portion 51 extends further upward than the upper end of the portion of the third vertical plate 23 located adjacent to the front side of the extension portion 51, it is possible to increase the height of the rear end portion of the third vertical plate 23 by the amount corresponding to the extension portion 51.

Therefore, it is possible to form the large cutout portion 50 while maintaining the strength and rigidity of the third vertical plate 23, to reduce the number of components and processing steps by eliminating the bracket, and to reduce the manufacturing costs.

According to the embodiment, since the cross-sectional area of the edge portion 50b of the third vertical plate 23 located adjacent to the upper side of the cutout portion 50 increases gradually as the edge portion 50b advances from the rear side toward the front side, it is possible to suppress the cross-sectional area from changing abruptly in the front-rear direction. Due to this, when the large cutout portion 50 is formed across both the extension portion 51 and the lower portion of the extension portion 51, it is possible to suppress concentration of stress on a partial portion of the third vertical plate 23 even if heavy load is applied to the common pedestal 52 (the extension portion 51) from the upper side.

According to the embodiment, two support portions 52a and 52b to which heavy load is applied can be collectively provided in one common pedestal 52, and the common pedestal 52 can be supported by the rear end portion of the third vertical plate 23.

Further, since both support portions 52a and 52b are distributed in the front-rear direction along which the third vertical plate 23 (the extension portion 51) extends (that is, the direction in which the extension portion 51 exhibits excellent strength and rigidity), it is possible to transmit the load applied to both support portions 52a and 52b to the extension portion 51 in a well-balanced manner and to support both support portions 52a and 52b stably.

The intermediate weight pedestal 33 has relatively high strength and rigidity in order to support the weight wall portion 12b that functions as a counterweight. Due to this, by bonding the rear end portion of the third vertical plate 23 to the intermediate weight pedestal 33, the rear end portion of the third vertical plate 23 and the bottom plate 20 are fixed more tightly, and the strength and rigidity of the rear end portion of the third vertical plate 23 can be strengthened.

Since the cutout portion 50 has such a shape that is open to the rear side, it is possible to either insert or remove the distal end portion of the tail pipe 11c into/from the cutout portion 50, from the rear side in a state where the rear wall portion 12 is detached from the weight pedestals 31 to 33 and to facilitate assembling and disassembling of the tail pipe 11c. Further, since the distal end portion of the tail pipe 11c assembled with the cutout portion 50 is positioned in the rear portion of the upper slewing body 4, it is possible to easily access the distal end portion of the tail pipe 11c from the rear side of the upper slewing body 4 in a state where the rear wall portion 12 is detached from the weight pedestals 31 to 33 and to facilitate the maintenance of the tail pipe 11c.

According to the embodiment, since the space under the engine 11 can be covered with the first beam plate 24 from the front side, it is possible to utilize the space under the engine 11 as a duct for mixing the exhaust gas with the gas inside the engine room 8 more effectively.

The working machine according to the present invention is not limited to the embodiment described above and includes various other configurations. In the embodiment, although the tail pipe 11c is disposed so that the distal end portion of the tail pipe 11c faces the rear portion of the exhaust opening 27 (see FIG. 5), the tail pipe 11c may be bent and the tail pipe 11c may be disposed so that the distal end portion of the tail pipe 11c faces the center of the exhaust opening 27. The extension portion 51 may not be provided. That is, the rear end portion of the third vertical plate 23 may not serve as the bracket of the common pedestal 52. The first and third vertical plates 21 and 23 may not be provided separately but may be configured as one vertical plate similarly to the second vertical plate 22.

The specific embodiment described above mainly includes the inventions having the following configurations.

That is, the present invention provides a working machine including: a lower traveling body; and an upper slewing body provided on the lower traveling body so as to be able to slew and the upper slewing body being configured to perform a working operation according to an operation of an operator, wherein the upper slewing body includes: an engine provided in a rear portion of the upper slewing body; an exhaust pipe extending from the engine in order to guide exhaust gas; a rear wall portion covering an engine room accommodating the engine from a rear side; a floor wall portion disposed so as to cover the engine room from a lower side and the floor wall portion having an exhaust opening that opens the engine room to a lower side; and a pair of vertical plates standing upright on both left and right sides of the exhaust opening of the floor wall portion and the pair of vertical plates extending in a front-rear direction on a lower side of the engine, one of the pair of vertical plates is a pipe-insertion vertical plate, and the pipe-insertion vertical plate includes a rear end portion having a proximate rear end surface disposed adjacent to the rear wall portion so as to prevent the exhaust pipe from passing between the pipe-insertion vertical plate and the rear wall portion and a cutout portion formed by recessing a rear end surface of the pipe-insertion vertical plate toward a front side with respect to the proximate rear end surface, the exhaust pipe is disposed across an outer position of the pair of vertical plates and an inner position of the pair of vertical plates through the cutout portion and has a distal end portion for discharging the exhaust gas, and the distal end portion of the exhaust pipe is disposed at the inner position of the pair of vertical plates, and the distal end portion of the exhaust pipe extends along the exhaust opening in a state of facing the exhaust opening.

In this working machine, the pair of vertical plates extending in the front-rear direction on the lower side of the engine stand upright on the floor wall portion disposed so as to cover the engine room from the lower side. The exhaust opening is formed between the pair of vertical plates of the floor wall portion. The rear end portion of the pipe-insertion vertical plate has the cutout portion formed by recessing the rear end surface of the pipe-insertion vertical plate toward the front side with respect to the proximate rear end surface. The exhaust pipe is disposed across the outer position of the pair of vertical plates and the inner position of the pair of vertical plates through the cutout portion. The distal end portion of the exhaust pipe is disposed at the inner position of the pair of vertical plates, and the distal end portion of the exhaust pipe extends along the exhaust opening in a state of facing the exhaust opening.

According to the present invention, by using the dead space provided under the engine as a duct, it is possible to eliminate a duct which has been provided conventionally.

Specifically, when the distal end portion of the exhaust pipe is disposed in the space (dead space) surrounded by the engine, the pair of vertical plates, the floor wall portion, and the rear wall portion, gas inside the engine room and the exhaust gas are mixed together in the space and this mixture is discharged from the exhaust opening.

Thus, according to the present invention, even when members are densely disposed inside the engine room and there is no space margin, it is possible to discharge exhaust gas from the exhaust opening while reducing the heat and the noise of the exhaust gas.

Moreover, since the rear end portion of the pipe-insertion vertical plate are cut out rather than forming a hole in the side surface of the pipe-insertion vertical plate or cutting out the upper end portion of the pipe-insertion vertical plate, when the cutout portion is formed in a portion of the pipe-insertion vertical plate behind an engine mounting portion as described above, it is possible to maintain the strength and rigidity of the pipe-insertion vertical plate.

In the working machine, it is preferable that the upper slewing body further includes a device supporting member for supporting a predetermined device above the cutout portion, the rear end of the pipe-insertion vertical plate has an extension portion, and the extension portion extends further upward than an upper end of a portion of the pipe-insertion vertical plate located adjacent to a front side of the extension portion, and serves as a bracket that supports the device supporting member.

According to this aspect, the extension portion of the pipe-insertion vertical plate can be used as a bracket for supporting the device supporting member. Here, the extension portion extends further upward than the upper end of the portion of the pipe-insertion vertical plate located adjacent to the front side of the extension portion, it is possible to increase the height of the rear end portion of the pipe-insertion vertical plate by the amount corresponding to the extension portion.

Therefore, it is possible to form a large cutout portion while maintaining the strength and rigidity of the pipe-insertion vertical plate, to reduce the number of components and processing steps by eliminating the bracket, and to reduce the manufacturing costs.

In the working machine, it is preferable that the cutout portion is formed in a range across both the extension portion and a lower portion of the extension portion, in the rear end portion of the pipe-insertion vertical plate, and a lower end surface of an edge portion of the pipe-insertion vertical plate located adjacent to an upper side of the cutout portion is tilted downward as the lower end surface of the edge portion of the pipe-insertion vertical plate advances toward the front side.

According to this aspect, since the cross-sectional area of the edge portion of the pipe-insertion vertical plate located adjacent to the upper side of the cutout portion increases gradually as the edge portion advances from the rear side to the front side, it is possible to suppress the cross-sectional area from changing abruptly in the front-rear direction. Due to this, when the large cutout portion is formed across both the extension portion and the lower portion of the extension portion, it is possible to suppress concentration of stress on a partial portion of the pipe-insertion vertical plate even if heavy load is applied to the device supporting portion (the extension portion) from the upper side.

In the working machine, in a case where the upper slewing body further includes a driver's seat provided adjacent to the engine, it is preferable that the device supporting member includes a first support portion supporting the engine and a second support portion provided at a different position from the first support portion in the front-rear direction and supporting the driver's seat.

According to this aspect, two support portions to which heavy load is applied are collectively provided in one device supporting member and the device supporting member can be supported by the rear end portion of the pipe-insertion vertical plate.

Further, since both support portions are distributed in the front-rear direction along which the pipe-insertion vertical plate (the extension portion) extends (that is, a direction in which the support portion exhibits excellent strength and rigidity), it is possible to transmit the load applied to both support portions to the extension portion in a well-balanced manner and to support both support portions stably.

In the working machine, it is preferable that a weight wall portion configured to function as a counterweight is provided in a lower portion of the rear wall portion, the upper slewing body further includes a weight supporting member bonded to the floor wall portion in a state of overlapping a portion of the floor wall portion on the rear side of the exhaust opening and the weight supporting member supporting the weight wall portion, and the rear end portion of the pipe-insertion vertical plate is bonded to the weight supporting member.

The weight supporting member has relatively high strength and rigidity in order to support the weight wall portion that is configured to function as a counterweight. Due to this, by bonding the rear end portion of the pipe-insertion vertical plate to the weight supporting member, the rear end portion of the pipe-insertion vertical plate and the floor wall portion are fixed more tightly, and the strength and rigidity of the rear end portion of the pipe-insertion vertical plate can be strengthened.

In the working machine, it is preferable that the upper slewing body has a rear wall attachment portion allowing attachment and detachment of the rear wall portion.

Since the cutout portion has such a shape that is open to the rear side, it is possible to insert the distal end portion of the exhaust pipe into the cutout portion from the rear side in a state where the rear wall portion is detached from the rear wall attachment portion and to facilitate assembling and disassembling of the exhaust pipe. Further, since the distal end portion of the exhaust pipe assembled with the cutout portion is positioned in the rear portion of the upper slewing body, it is possible to easily access the distal end portion of the exhaust pipe from the rear side of the upper slewing body in a state where the rear wall portion is detached from the rear wall attachment portion and to facilitate the maintenance of the exhaust pipe.

In the conventional working machine (for example, Japanese Patent Application Publication No. 2013-24078), since the distal end portion of the exhaust pipe is inserted into the duct and the distal end portion of the exhaust pipe is positioned deep inside the engine room, it is difficult to perform assembling and disassembling. However, according to the above aspect, it is possible to solve these problems.

In the working machine, it is preferable that the upper slewing body further includes a beam plate standing upright on the floor wall portion on the front side of the exhaust opening and connecting the pair of vertical plates in the lower portion of the engine.

According to this aspect, since the space under the engine can be covered with the beam plate from the front side, it is possible to utilize the space under the engine as a duct for mixing the exhaust gas with the gas inside the engine room more effectively.

This application is based on Japanese Patent application No. 2013-193939 filed in Japan Patent Office on Sep. 19, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A working machine comprising:
a lower traveling body; and
an upper slewing body provided on the lower traveling body so as to be able to slew and the upper slewing body being configured to perform a working operation according to an operation of an operator, wherein the upper slewing body includes:
an engine provided in a rear portion of the upper slewing body;
an exhaust pipe having a base end portion connected to the engine and a distal end portion for discharging exhaust gas, the exhaust pipe extending from the base end portion to the distal end portion in order to guide exhaust gas;
a rear wall portion covering an engine room accommodating the engine from a rear side;
a floor wall portion disposed so as to cover the engine room from a lower side and the floor wall portion having an exhaust opening that opens the engine room to a lower side; and
a pair of vertical plates standing upright on the floor wall portion and the pair of vertical plates extending in a front-rear direction on a lower side of the engine, the exhaust opening being formed in the floor wall portion at an inner position between the pair of vertical plates, wherein
one of the pair of vertical plates is a pipe-insertion vertical plate, and the pipe-insertion vertical plate includes a rear end portion having a proximate rear end surface disposed adjacent to the rear wall portion so as to prevent the exhaust pipe from passing between the pipe-insertion vertical plate and the rear wall portion and a cutout portion formed by recessing a rear end surface of the pipe-insertion vertical plate toward a front side with respect to the proximate rear end surface,
the exhaust pipe has an outer portion between the base end portion and the distal end portion and an extending portion between the outer portion and the distal end portion, the outer portion of the exhaust pipe lying at an outer position of the pair of vertical plates, the extending potion of the exhaust pipe extending through the cutout portion, and
the distal end portion of the exhaust pipe is disposed at the inner position between the pair of vertical plates, and the distal end portion of the exhaust pipe extends along the exhaust opening in a state of facing the exhaust opening.

2. The working machine according to claim 1, wherein
the upper slewing body further includes a device supporting member for supporting a predetermined device above the cutout portion,
the rear end portion of the pipe-insertion vertical plate has an extension portion, and
the extension portion extends further upward than an upper end of a portion of the pipe-insertion vertical plate located adjacent to a front side of the extension portion, and serves as a bracket that supports the device supporting member.

3. The working machine according to claim 2, wherein
the cutout portion is formed in a range across both the extension portion and a lower portion of the extension portion, in the rear end portion of the pipe-insertion vertical plate, and
a lower end surface of an edge portion of the pipe-insertion vertical plate located adjacent to an upper side of the cutout portion is tilted downward as the lower end surface of the edge portion of the pipe-insertion vertical plate advances toward the front side.

4. The working machine according to claim 2, wherein
the upper slewing body further includes a driver's seat provided adjacent to the engine, and
the device supporting member includes a first support portion supporting the engine and a second support portion provided at a position different from the first support portion in the front-rear direction and supporting the driver's seat.

5. The working machine according to claim 1, wherein
a weight wall portion configured to function as a counterweight is provided in a lower portion of the rear wall portion,
the upper slewing body further includes a weight supporting member bonded to the floor wall portion in a state of overlapping a portion of the floor wall portion on the rear side of the exhaust opening and the weight supporting member supporting the weight wall portion, and
the rear end portion of the pipe-insertion vertical plate is bonded to the weight supporting member.

6. The working machine according to claim 1, wherein
the upper slewing body has a rear wall attachment portion allowing attachment and detachment of the rear wall portion.

7. The working machine according to claim 1, wherein
the upper slewing body further includes a beam plate standing upright on the floor wall portion on the front side of the exhaust opening and connecting the pair of vertical plates in the lower portion of the engine.

8. A working machine comprising:
a lower traveling body; and
an upper slewing body provided on the lower traveling body, wherein the upper slewing body includes:
an engine provided in the upper slewing body;
an exhaust pipe having a base end portion connected to the engine and a distal end portion for discharging exhaust gas;
a rear wall portion covering an engine room accommodating the engine from a rear side;

a floor wall portion disposed so as to cover the engine room from below, the floor wall portion having an exhaust opening; and a pair of vertical plates standing upright on the floor wall portion and in a front-rear direction below the engine, wherein a space is provided below the engine, above the floor wall portion and between the pair of vertical plates, and wherein the exhaust opening is formed in the floor wall within said space and between the pair of vertical plates, wherein the distal end portion of the exhaust pipe is disposed in said space and between the pair of vertical plates.

\* \* \* \* \*